United States Patent

[11] 3,588,334

[72] Inventor Marvin Camras
Glencoe Village, Ill.
[21] Appl. No. 627,756
[22] Filed Apr. 3, 1967
[45] Patented June 28, 1971
[73] Assignee IIT Research Institute
Chicago, Ill.

[54] VIDEO RECORDING SYSTEM AND METHOD
5 Claims, 7 Drawing Figs.

[52] U.S. Cl. .......... 178/6.6, 178/6
[51] Int. Cl. .......... H04n 1/78
[50] Field of Search .......... 178/66 (A), 6 (BWR); 179/15.55, 100.2 (T)

[56] References Cited

UNITED STATES PATENTS

| | | | |
|---|---|---|---|
| 2,539,837 | 1/1951 | Howell | 179/100.2T |
| 2,874,214 | 2/1959 | Anderson | 178/6.6A |
| 2,886,650 | 5/1959 | Fairbanks | 179/15.55 |
| 2,903,521 | 9/1959 | Ellison | 179/55.55 |
| 2,955,157 | 10/1960 | Young | 178/6.6A |
| 2,912,493 | 11/1959 | Crooks | 178/6.6A |
| 3,095,473 | 6/1963 | Roizen | 178/6.6A |
| 3,294,902 | 12/1966 | Maxey | 178/6.6A |

*Primary Examiner*—Robert L. Griffin
*Assistant Examiner*—Joseph A. Orsino, Jr.
*Attorney*—Hill, Sherman, Meroni, Gross and Simpson

ABSTRACT: A magnetic transducer system and method for varying the speed of action of a recorded video signal including a video camera with a selectable scan rate, a magnetic recorder for recording the video signals from the camera at a given speed, a variable speed drive for the recorder for playback of the recorded video signals at a second speed such that the playback scan rates are the standard rates for display by a commercial television receiver, or integral multiples or submultiples of such standard rates. A rotatable head recorder or playback device with stationary scanning during the other of playback or recording may be employed.

PATENTED JUN 28 1971 3,588,334

INVENTOR.
MARVIN CAMRAS
BY
Hill, Sherman, Meroni, Gross & Simpson
ATTORNEYS

VIDEO RECORDING SYSTEM AND METHOD

FIELD OF THE INVENTION

This invention pertains to a magnetic transducer system and method for varying the speed of action of a recorded video signal. Furthermore, this invention relates to an improved transducer system which is adapted to receive video signals for recording at one speed and playback the recorded video signal at a second speed which is an integral multiple, or submultiple of the recorded speed for display by a commercial television receiver.

PRIOR ART

It is known to use video recorders comprising stationary magnetic transducers for receiving and/or playback of video signals on a magnetic record member such as a tape. The use of rotary head recorders for recording and playback is also known. The rotary head recorder has an inherent time varying capability when there is a variable speed drive for the record member.

Use of slow motion effects is particularly useful for studying rapid sequences of action particularly for sports such as football and golf. A speeded up motion is useful for comic effects in home movies.

The method of analyzing and synthesizing visual images employed in modern television systems is known as linear scanning. A small area of the picture tube is traversed by a scanning agent in a series of horizontal lines moving every point on an image at constant speed and discovering the degree of brightness at each point in succession. Electrical impulses corresponding to the successive values of brightness discovered by the scanning agent are generated by a television camera.

The scanning technique currently used is known as interlacing. The image is scanned in two groups of lines, the scanning motion in "two field odd-line" interlaced scanning involves scanning in substantially horizontal directions across the tube. The scanning is downward with a back and forth motion.

One set of the two sets of lines in the interlaced pattern is known as an interlaced field, or field. Two interlaced fields are a frame. The total number of lines in the complete frame is an odd number conventionally 525. The number of lines per field is a whole number plus one-half 262½.

The frame repetition rate is a multiple of the power frequency used in the United States. The FCC standard frame rate is 30 frames per second or 60 fields per second. "V" refers to the number of fields per second.

The scanning waveforms have fundamental frequencies determined by the number of fields per second and by the number of lines per second. In the vertical direction the scanning force must repeat itself at the field repetition rate V. In the horizontal direction a deflecting force must repeat itself at the line scanning frequency 525 lines per frame, 30 frames per second which is 15,750 Hz. the FCC standard. The horizontal frequency is represented by "H." The FCC standards for H and V, 15,750 lines per second and 60 fields per second, respectively, are the commercial television standard rates in the United States.

In one type of magnetic video recording system a length of a magnetic record member such as a tape having a magnetizable layer is drawn in scanning relation to a magnetic transducer at substantially uniform linear velocity. The magnetic transducer has a stationary head which includes a magnetic core having a nonmagnetic gap over which the record member passes and which is provided with suitable elements to produce a magnetic field across the gap which varies in accordance with an intelligence signal.

In this system, the recorded video signal extends parallel to the direction of travel of the record member. The magnetic record member is drawn across the same or a similar magnetic transducer to set up a flux in the core member in accordance with the degree of magnetization of the record member along successive incremental lengths as it is passed along the gap of the magnetic core for playback. The resultant time varying flux induces a voltage in the magnetic transducer. This voltage may be amplified and suitably reproduced to provide video signals including intelligence and synchronizing signals suitable for the operation of a commercial television receiver.

The magnetic transducer is automatically and selectively positioned in scanning relation to the direction of movement of the lengthy record member.

SUMMARY

In accordance with the present invention I have provided a magnetic transducer system for varying the speed of action of a recorded video signal by varying the scan rate of a source of video signals and the record speed relative to the playback speed of a magnetic record member. The video signal on playback is at the standard scan rate for display by a commercial television receiver.

Accordingly, it is an object of the present invention to provide a magnetic transducer system and method for varying the speed of action of a recorded video signal.

Another object of the present invention is to provide a magnetic transducer system and method having a selectable scan rate for a source of video signals and a stationary magnetic transducer for supplying a standard scan rate video signal to a commercial television receiver on playback.

A further object of this invention is to provide a magnetic transducer system and method for varying the playback time of a recorded video signal having a rotatable head recorder or playback device which is capable of varying the speed of action of a video signal while supplying a standard scan rate video signal to a commercial television receiver.

Many other advantages, features and additional objects of the present invention will become manifest to those versed in the art upon making reference to the detailed description and the accompanying sheet of drawings in which preferred structural embodiments incorporating the principles of the present invention are shown by way of illustrative example.

ON THE DRAWINGS

AS SHOWN ON THE DRAWINGS

Figure 1:
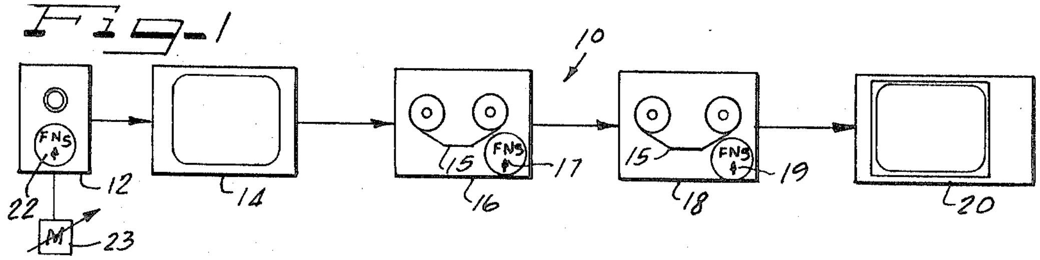
FIG. 1 is a block diagram of a magnetic transducer system according to the invention.

The principles of this invention are particularly useful when embodied in a magnetic transducer system as illustrated in FIG. 1, generally indicated by the numeral 10. In the block diagram 10 a picture image is sensed by a television camera 12 which transmits a video signal through a television monitor 14 to a stationary head magnetic recorder 16 having a magnetic record member 15. In playback the magnetic record member 15 is placed on a stationary head magnetic playback device 18 which transmits the reproduced video signal to a commercial television receiver 20. The magnetic recorder 16 and playback device 18 have speed selector switches 17, 19 respectively.

In practice, the recorder 16 and playback device 18 for a closed circuit television system could be the same component having a switch for selecting record or playback mode of operation. In the block diagram 10, the magnetic recorder 16 and playback device 18 are shown as separate components in order to graphically illustrate the point that the magnetic record member 15 may be played back by other devices. The magnetic record member 15 used may be made to commercial standards in order to minimize cost and special component requirements for closed circuit systems.

The camera 12 has a scan rate selector switch 22 capable of varying the scan rate for slow, normal and fast speed of action by selecting the frequency of the H and V sweep generators 23. The speed of action of the video picture may be varied in the record-playback of this stationary head embodiment. The image information provided by the camera 12 is scanned at faster, normal or slower integral multiples or submultiples of the standard scan rate, while recording the scans, and then the scans are played back at a slower or faster speed than the recording speed. Thus, the playback information is at the standard scan rate which is then provided to a television receiver 20.

The scan rate of the camera 12 is an integral multiple or submultiple of the standard scan rate. Both horizontal and vertical rates are changed by the same multiple. The camera 12 is also capable of scanning at the standard rate. The selector 22 is provided for changing both H and V rates of scanning by the same multiple.

In the embodiment used in the development of the invention, the camera 12 was a standard vidicon camera for a closed circuit system. The vidicon camera has its own horizontal oscillator and multivibrator oscillator for vertical scanning. In order to increase the scan rate, the inductance and capacitance of the horizontal oscillator frequency determining portion were decreased, and the resistance or capacitance in the vertical multivibrator oscillator were decreased to obtain an H of 31,500, and V of 120. Similarly, in order to decrease the scan rate, the inductance and capacitance of the horizontal oscillator frequency determining portion were increased, and the resistance or capacitance in the vertical multivibrator oscillator were increased.

In a commercial studio, the cameras would be locked in a master synchronization system. However, the scanning rate of the camera can be locked to a multiple or submultiple of the master rate, with appropriate generation of synchronizing pulses at the new rate. In practice, it is contemplated that selection of the scan rate will be accomplished by a detent switching method for selecting appropriate frequency determining components for the horizontal oscillator and the vertical multivibrator oscillator frequency determining portions, respectively.

In Table I there is set forth various combinations and permutations of scanning rates with record and playback speeds for use in the invention. As indicated by line 1:1 the standard H and V rates are 15,750 and 60 Hz respectively. For half speed action the 1:2 speed is used. Here the scan rates for recording on the magnetic record member 15 are 31,500 and 120. The scan rate is halved from the normal to achieve a fast playback, 2:1, with the camera scanning at an H of 7,875 and a V of 30. Thus, the scan rates are integral multiples or submultiples of the standard scan rate.

Specifically, with regard to the half speed playback the scan rate is doubled both horizontally and vertically by means of the switch 22 which doubles the standard frequency of the sweep generators 23 to the camera 12 during the recording process. The speed of the magnetic record member 15 is selected by switch 17 for double speed, 120 inches per second, line 1:2 of Table I. The monitor 14 will show four pictures if the monitor sweep is standard. Referring again to line 1:2 a playback speed is selected by switch 19 for normal speed for the device 18, 60 inches per second. A standard scan rate picture will be shown on the television set 20 without changing the internal components of the television set. All of the motion, however, will be at half speed.

For double speed, line 2:1 of Table I is applicable. The camera scan rate is slowed down by means of switch 22 selecting half standard sweep frequencies from generator 23. H and V during recording are half the standard rate and the recording speed is 30 inches per second. The tape 15 is then played back by device 18 at double the recording speed, 60 inches per second vs. 30 inches per second for recording by appropriate speed selection by switch 19. The action will appear at double speed on the television set 20. Since H and V are conventional the camera resolution, bandwidth of amplifiers of the camera 12, and the recorder 16 and playback device 18 should be increased in proportion to the scan rate increases to take advantage of the higher tape speed and yet give good normal play resolution when at lower speed.

If the television set 20 is slowed with respect to horizontal and vertical scanning on playback, the horizontal resolution should be improved compared to that at standard scan rate.

Some multiples of speeds can be made by a combination of speeding up the camera scan and slowing down the television set playback scan. For example, a recording made at 120 inches per second tape speed with an H of 31,500 and V of 120, may be played back through device 18 at 60 inches per second and television receiver 20 scans normally at 15,750 H and 60 V. In this case the action is at half speed. If the same tape is further slowed to 30 inches per second and the receiver 20 adjusted to 7,875 and 30 for H and V the situation shown in line 1:4 occurs. This is quarter speed. Alternatively, the receiver scan may be normal and the camera scan may be 63,000 and 240 for H and V.

With respect to the H of 7,875 and V of 30, this may also be used with the alternative 1:2 embodiment indicated in Table I. This may require some adjustment of the commercial television set 20, in that the picture tube voltage is derived from the horizontal scan system and a weaker picture at half voltage results at the tube. If an independent high voltage supply is provided a stronger television picture will be possible. Also, it is likely that there will be more flicker.

In development, a Zenith 14L30 chassis was used and a 0.007 microfarad capacitor put in parallel with the horizontal oscillator coil to adjust for the H of 7,875. A 1.5 megohm resistor was inserted in the vertical hold control to adjust for the V of 30.

Similarly, for the higher scan rates shown in the 2:1 and 4:1 lines of Table I the higher scan rates impressed on the receiver 20, an H of 31,500 and V of 120 may require special changes of the sweep and high voltage sections of the television set, particularly at higher ratios as in the 4:1 embodiment. The reason that scan rates other than normal scan rates may be supplied to the television receiver 20 is that there is an advantage in using existing recording facilities, or imparting slow or fast motion to recordings which have already been made. However, the use of such existing facilities may require the alterations in the receiver 20.

The preferred embodiment however, envisions the use of the selector switch 22 on a camera 12 such that adjustments for the speed of action are made in the camera circuitry, including the frequency of the sweep generators 23, which may be built in the camera 12. The camera is a single unit and may require special features other than special tuning circuits. Flicker and other factors are unaltered when a standard scan rate video signal is supplied to a commercial television receiver. The resolution of the camera 12 should be in proportion to its scan rate however, and similarly the resolution of magnetic recorder 16. Where the television receiver 20 is conventional and the adjustment made in the scanning rate of the camera 12 the television receiver 20 does not have to be changed. Finally, the tape may be played at normal speed for playback so that sequences of slow motion can be interspersed with normal speed sequences without change of tape speed during playback. Similarly, the speeded up effects may be obtained at normal tape playback speed if the camera scan and tape speed are altered during recording only.

Prerecorded tapes made at different speeds for slow or fast action during playback are thus capable of being used by conventional playback devices 18 with conventional television receivers 20. The recording need not be made on a linear tape but can be made on a record member such as a disc or drum.

An example of the above with a linear tape for a record member having interspersed speed sequences is that a program on the tape may contain sequences made at 60 inches per second under normal scan rate These sequences will appear at normal speed. The tape may additionally contain sequences made at a recording speed of 120 inches per second at a double scan rate and these sequences will appear at half speed corresponding to a line 1:2 in Table I.

Figures 2, 3, 4:
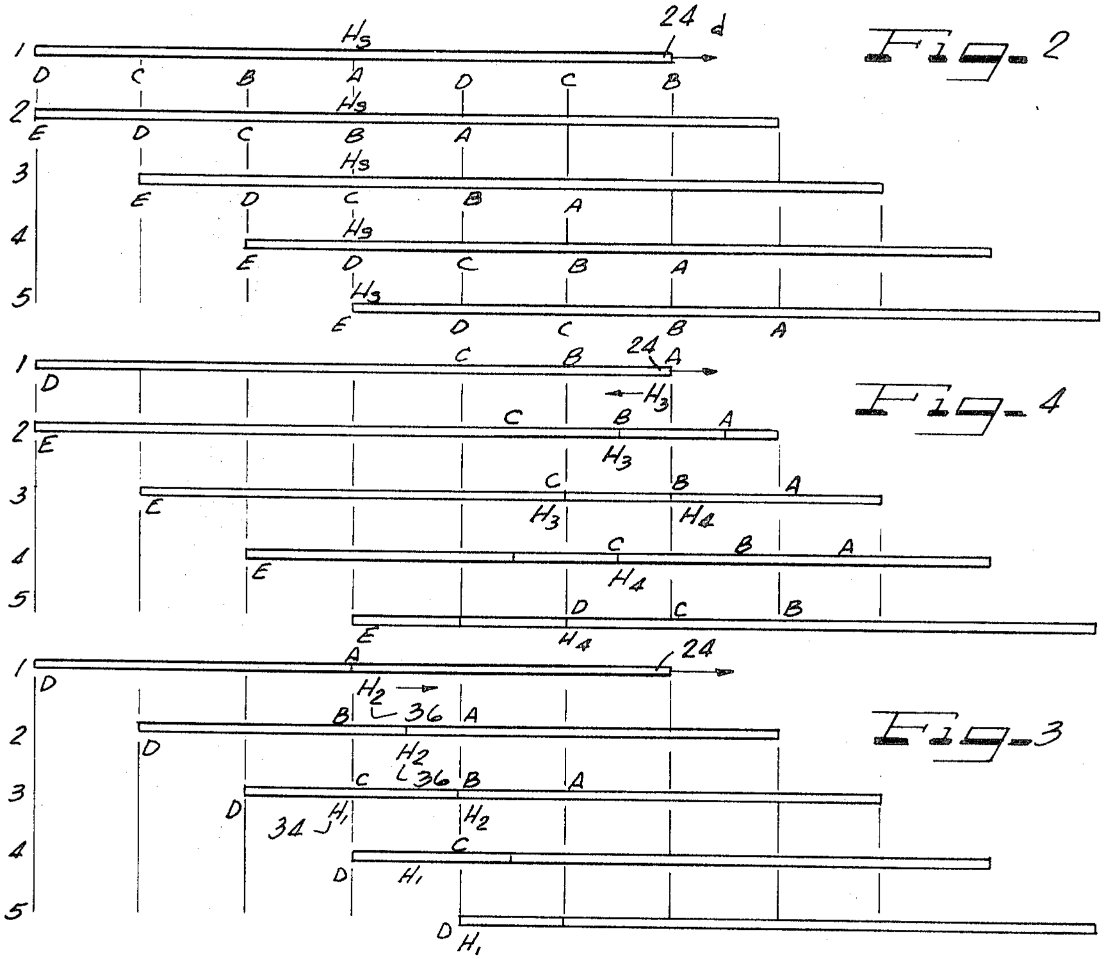
FIGS. 2, 3 and 4 are schematic representations of the relationship between the magnetic record member and the magnetic transducer useful in explaining the operation of the system.

In the stationary head embodiment, the operation of the system of FIG. 1 is shown in FIG. 2. A linear record member 24 is disposed in scanning relation to a magnetic transducer, stationary head *Hs*. The stationary head *Hs* both records on the tape 24 and reproduces the recorded signal on the tape for playback. Using the half speed 1:2 relationship set forth in Table I, it is seen that if a scan rate of 31,500, and 120 is recorded at a speed of 120 inches per second recording speed segments AB, BC, CD and DE will be recorded in the successive periods of time represented by lines 1—5 when the magnetic tape 24 is played back at 60 inches per second. Thus, tape 24 will travel only half the distance past the head *Hs*. Segments AB and BC will pass the head *Hs* in the given period of time. Thus, the action in the played-back picture takes place at half the speed of the original action.

A rotating head for repeated scan of a portion of a linear magnetic record member is an alternative way of obtaining fast, slow or stopped motion.

Figures 5, 6:
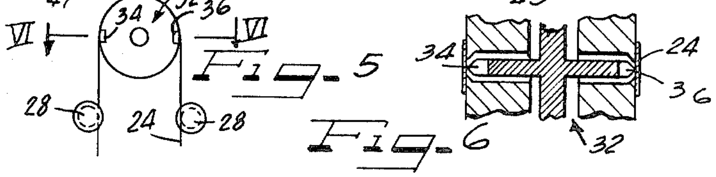
FIG. 5 is a fragmentary view of an alternative rotary head embodiment of the invention.
FIG. 6 is a fragmentary sectional view taken along the line VI–VI of FIG. 5.

FIGS. 5 and 6 are fragmentary views of a rotary head 32 useful with either the record 16 or playback device 18 of FIG. 1. The tape 24 is moved past guides 28 to a rotary head 32 having a pair of magnetic transducers 34, 36 thereon. The tape is in scanning relation to the head 32 for 180°. The guides 28 are shiftable parallel to the axis of 32 for selecting parallel tracks on the tape.

Table II is similar to Table I and sets forth the relationship between the speed of action, scan rate, record speed, playback speed and scanning rate of the reproduced video signal for a rotary head in the playback device of a transducer system. In order to obtain a 1:1 speed of action for record and reproduction, the head would be held stationary. When the head 32 moves in a counterclockwise direction, CCW, the linear record member 24 and the head 32 are moving in the same direction. The operation of such a system may be easily grasped from FIG. 3.

The head 32 with the pair of magnetic transducers 34, 36 or $H_1$,$H_2$, respectively, is moving at half the velocity of the tape 24 and in the same direction as the tape. During the interval of lines 1 to 3 $H_2$ scans segments AB. The head $H_2$ then leaves the tape 24 and head $H_1$ begins to scan. Segment BC of tape 24 is never played. Head $H_1$ scans segment CD during its scan of the tape which constitutes half the rotation of head 32. Thus, where the rotary head is used as indicated in Table II for playback, the normal scan rates 15,750 and 60 can be used in both the camera and in the final display. However, the rates of record to playback speed of movement of the tape itself will determine the speed of action. In the above example the tape might be moved at 60 inches per second during record and 120 inches per second during playback for speeded action.

This is indicated in Table II, line 2:1. In this instance the head is moving in a counterclockwise direction, the head moving in the same direction as the magnetic tape and the horizontal definition is normal. The head velocity is half of the tape velocity and portions of the tape are omitted.

When the head moves at the same velocity as the tape but in the opposite direction, portions of the tape are repeated, line 1:2. In the playback device, the rotary head is traveling in a clockwise direction, the speed of action of the recorded video signal is at half speed. The tape is moved slower during playback than during recording for the 1:2 operating mode of Table II.

TABLE I.—STATIONARY RECORD AND PLAYBACK HEAD

| Operating mode | Speed action | Camera scan rate H, lines/sec. | Camera scan rate V, fields/sec. | Tape speed during record, IPS | Tape speed during playback, IPS | Display scan rate H, lines/sec. | Display scan rate V, fields/sec. |
|---|---|---|---|---|---|---|---|
| 1:1 | Normal | 15,750 | 60 | 60 | 60 | 15,750 | 60 |
| 1:2 | Slow | 31,500 | 120 | 120 | 60 | 15,750 | 60 |
| 1:2 Alt | | 15,750 | 60 | 120 | 60 | 7,875 | 30 |
| 1:4 | Slower | 31,500 | 120 | 120 | 30 | 7,875 | 30 |
| 2:1 | Fast | 7,875 | 30 | 30 | 60 | 15,750 | 60 |
| 2:1 Alt | | 15,750 | 60 | 30 | 60 | 31,500 | 120 |
| 4:1 | Faster | 15,750 | 60 | 30 | 120 | 63,000 | 240 |

TABLE II.—ROTARY HEAD USED DURING PLAYBACK
(Camera and playback scan rates are standard H, 15,750; V, 60 in all cases)

| Operating mode | Tape speed during record, IPS | Tape speed during playback, IPS | Head motion relating to tape | Head velocity absolute, IPS | Head to tape velocity, IPS | Horizontal definition considered normal) | Remarks |
|---|---|---|---|---|---|---|---|
| 1:1 | 60 | 60 | None | 0 | 60 | Normal | Stationary head playback. |
| 1:2 | 120 | 60 | Opposite | 60 | 120 | Twice | Action at half speed. Each field played twice. |
| 2:1 | 60 | 120 | Same | 60 | 60 | Normal | Action at double speed. Alternate fields omitted. |
| 1:4 | 120 | 30 | Opposite | 90 | 120 | Twice | Action at ¼ speed. Every field played 4 times. |
| −1:1 | 60 | 60 | Same | 120 | −60 | Normal | Action at normal speed. Inverted display (reverse time sequence). |
| −1:2 | 120 | 60 | do | 180 | −120 | Twice | Action at half speed. Reverse sequence. Fields repeated and interlaced. |
| −2:1 | 60 | 120 | do | 180 | −60 | Normal | Action at double speed. Reverse sequence. Alternate fields omitted. |
| 0:1 | 60 | 0 | | 60 | 60 | do | "Still Motion". |

TABLE III.—ROTARY HEAD USED DURING RECORDING (Camera and playback scan rates are standard H, 15,750; V, 60 in all cases)

| | Tape speed during rec., IPS | Head motion relative to tape | Head velocity absolute, IPS | Head to tape velocity, IPS | Tape speed during playback IPS | Horizontal definition (60 IPS considered normal) | Remarks |
|---|---|---|---|---|---|---|---|
| Operating mode: | | | | | | | |
| 1:1 | 60 | None | 0 | 60 | 60 | Normal | Stationary head recording. |
| 1:2 | 120 | Same | 60 | 60 | 60 | do | Action half speed. Each field recorded twice. |
| 2:1 | 60 | Opposite | 60 | 120 | 120 | Twice | Action twice speed. Alternate fields recorded. |
| 3:1 | 40 | do | 80 | 120 | 120 | do | Action twice speed. Only every third field recorded. |

Clockwise, CW, head rotation opposite to direction of tape motion at a head velocity half that of the tape is shown in FIG. 4. Between lines 1 and 3, $H_3$ travels opposite the direction of tape and plays back sections AB and BC. For lines 3 to 5, $H_3$ is out of contact with the tape 24 but $H_4$ is sensing what is on the tape 24 and repeats segments BC and senses CD. $H_3$ then reenters a scanning relationship with the magnetic record member 24 and repeats CD and senses EF.

Table III sets forth the relationship for a magnetic transducer system having a rotary head in the recording devices as above. In order to obtain a 1:1 speed of action correspondence between the recorded video signal and the reproduced video signal, the rotary head would be held stationary.

Slow motion is achieved by rotating head 32 in the CCW direction and running the tape 24 at faster than normal speed during recording, FIG. 3. Each field is recorded twice (repeated) in the 1:2 example of Table III. When played back at normal speed on a fixed head machine the normal rate of 60 fields per second but the action is at half speed. In the 2:1 example of Table III the tape 24 is run at half speed during recording, and the CW rotating heads 32, FIG. 4, omit every other field, stacking the remaining ones next to each other. When played at normal speed on a fixed head machine the normal rate of 60 fields per second is obtained with the action at double speed.

Thus, in the operation of rotary heads to vary the speed of action, the situation shown in FIG. 3 is one in which alternate fields represented by segments AB, BC, CD and DE can be omitted. Only AB and CD are played with BC and DE omitted. By extension of this method alternate fields can be repeated which is a situation shown in FIG. 4 and this relieves flicker. Here each segment is played twice, e.g., AB, AB, BC, BC, etc. Extending this idea, selected fields third, fourth, etc. can be shown with others omitted or each field can be repeated several times giving even better flicker reduction. The head rotation is synchronized so as to give an integral number of field scans per rotation of head revolution.

Additional operating modes for the rotary head embodiment are set forth in Tables II and III with remarks indicating significant features of the reproduced signal. A "still motion" is achieved by stopping the tape during playback, Table II.

Figure 7:
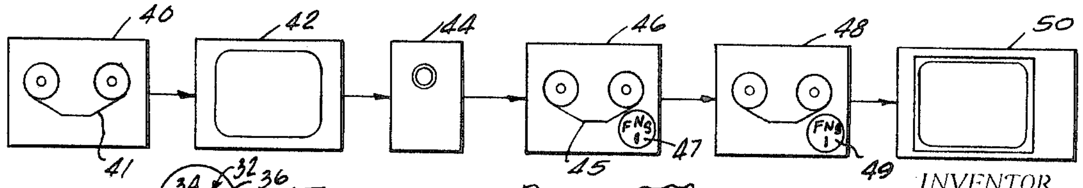
FIG. 7 is a block diagram of a video rerecord system according to the invention.

This invention is also capable of electronic application for rerecording, FIG. 7. A playback device 40 having record member 41 thereon, is connected to a display device 42 which is in scanning relation to a camera 44. A magnetic recorder 46 corresponds to the record device 16 and a speed selector switch 47 to the switch 17 of FIG. 1. The tape 45, which is recorded on the recorder 46, is then transferred to a playback device 48 which corresponds to the playback device 18 and speed selector switch 49 to the switch 49 to the switch 19 of FIG. 1. The output from the playback device 48 is supplied to a commercial television receiver 50 corresponding to the television receiver 20 of FIG. 1.

In this electronic rerecording method each field or line would be shown twice for slow motion reproduction at an initial playback speed of device 40 of 60 inches per second. The scanning rate of the camera 42 for slow motion reproduction is double the normal scan rate and the speed of the recorder device 46 is 120 inches per second for record member 45. The speed of playback device 48 is then selected to be 60 inches per second. The reproduced signal from tape 45 is at half speed with respect to the speed of action on tape 41. The video signal to the television receiver 50 is at the standard scan rate.

In this electronic method, each field or line is shown twice running at normal speed in playback. Recording is at double speed (copy tape 45 compared to master tape 41) repeating each field. The disclosure relative to Table I is applicable.

A rotating head can be used for slow motion rerecording. Each field during rerecording is repeated to obtain twice as many fields on the copy tape 45 by recording at double speed with CW head rotation and then reproducing the recorded signal on the playback device 48 at normal speed. The speed of action is thereby half as fast.

For increasing the speed of action to double speed of action the copy tape 45 is run half speed while each field is stretched out to double real time by a head moving in tape direction, CCW. The disclosure with respect to rotary head devices above, including Tables II and III, sets forth the mode of operation for the rotary head record embodiment.

From the foregoing, it will be obvious that because of the freedom of complexity of the disclosed system, wide spread application heretofore economically unsound is now possible. It is possible to eliminate the need for special equipment using selected embodiments of the invention to provide variable speed of action. Included in this category is the home type television recorder.

The variable motion video system is adaptable and may be used with systems such as parallel multiple channel recording on the tape. In such a system there are guides for channel selection by moving the tape laterally with respect to a rotating head. Similarly, a rotating head that samples the accompanying sound and increases or decreases its speed at the same rate that the action is changed, but maintains the pitch of this sound, is compatible with the variable motion video system and may be on the same rotating head or combined with the speed compression in my application entitled "Transducer System," Ser. No. 480,001, which utilizes slanting tracks on a magnetic tape and a rotating head to randomly select recorded portions of the sound.

It is also contemplated to have the tape speed selector switch ganged with the scan selector switch such that the correct display results for normal, fast or slow speeds of action. In the rotary mode the scan rate and the rotary head transducer speed may be correspondingly varied and coupled.

While the United States standards for monochrome television have been used for illustration, the variable motion video system operates equally well with other standards and for color television.

An extra head in quadrature to each of the heads shown in FIGS. 5—6 may be required in the case of rotary head recording Table III, for CCW head rotation in order to simultaneously record on the tape to avoid blank spaces on the tape. Similarly in CW rotation one of the heads may be disconnected to prevent overlap.

Although minor modifications might be suggested by those versed in the art, it should be understood that I wish to embody within the scope of the patent warranted hereon all such embodiments as reasonably and properly come within the scope of my contribution to the art.

I claim:

1. In a magnetic transducer system for varying the speed of action of a recorded video signal comprising in combination, a. a magnetic record member having a signal channel parallel to the direction of motion of said record member;
b. a magnetic transducer disposed in scanning relation to the signal channel of said record member;
c. variable speed drive means for driving said record member in a path past said magnetic transducer for record and playback of signals stored on said record member;
d. a source of video signals;
e. a television display device for connection to the transducer during playback and operable at a standard scan rate;
f. means for selectively varying the scan rate of the source of video signals and being adjusted to provide a scan rate of said source of video signals which is substantially different from the standard scan rate;
g. means for adjusting the variable speed drive means to record at a first speed; and
h. the variable speed drive means being adjusted during playback to drive the record member at a second speed different from said first speed causing reproduction of the video signals at the standard scan rate but with fast or slow motion.

2. A magnetic transducer system as recited in claim 1 wherein said means to vary the scan rate of said video source is a switch with positions for fast, normal and slow scan rates.

3. A magnetic transducer system as recited in claim 1 wherein said magnetic transducer is a stationary recording and playback head.

4. A magnetic transducer system as recited in claim 1 wherein the source of video signals has scan rates selectable by said means for varying the scan rate of said video signals which are integrally related to the standard scan rate.

5. The magnetic transducer system as recited in claim 2 wherein fast, normal and slow speed positions correspond to a multiple and integral submultiple of the normal speed.